United States Patent
Ukai et al.

(10) Patent No.: US 10,839,732 B2
(45) Date of Patent: Nov. 17, 2020

(54) VIDEO DISPLAY DEVICE

(71) Applicant: HITACHI-LG DATA STORAGE, INC., Tokyo (JP)

(72) Inventors: Ryuji Ukai, Tokyo (JP); Yoshiho Seo, Tokyo (JP); Yuya Ogi, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 185 days.

(21) Appl. No.: 16/310,958

(22) PCT Filed: Jul. 4, 2017

(86) PCT No.: PCT/JP2017/024527
§ 371 (c)(1),
(2) Date: Dec. 18, 2018

(87) PCT Pub. No.: WO2018/008644
PCT Pub. Date: Jan. 11, 2018

(65) Prior Publication Data
US 2020/0202759 A1    Jun. 25, 2020

(30) Foreign Application Priority Data
Jul. 7, 2016    (JP) ................................ 2016-135072

(51) Int. Cl.
*G09G 3/02* (2006.01)
*H04N 9/31* (2006.01)
*H04N 9/78* (2006.01)

(52) U.S. Cl.
CPC ........... *G09G 3/025* (2013.01); *H04N 9/3182* (2013.01); *H04N 9/78* (2013.01); *G09G 2320/0646* (2013.01)

(58) Field of Classification Search
CPC .......... G09G 3/025; G09G 2320/0646; H04N 9/3182; H04N 9/78; H04N 9/3194; H04N 9/3155; H04N 9/3135
See application file for complete search history.

(56) References Cited

U.S. PATENT DOCUMENTS 8,605,764 B1    12/2013    Rothaar et al.
2014/0192093 A1    7/2014    Haruna et al.
(Continued)

FOREIGN PATENT DOCUMENTS

JP    2014-086426 A    5/2014
JP    2014-132286 A    7/2014
(Continued)

OTHER PUBLICATIONS

Extended European Search Report received in corresponding European Application No. 17824247.5 dated Jan. 30, 2020.
(Continued)

*Primary Examiner* — Abhishek Sarma
(74) *Attorney, Agent, or Firm* — Mattingly & Malur, PC

(57) ABSTRACT

The video display device includes a laser light source unit, a video processing unit that outputs a video gradation signal, a current gain signal, and a current offset signal, a laser driver that outputs the drive current based on the video gradation signal, the power supply gain signal, and the current offset signal, and a dimming level processing unit that divides a dimming level for designating brightness of a video into a plurality of dimming modes and divides the dimming level into in-mode levels within the divided dimming modes, wherein the video processing unit includes a video gradation value output unit that outputs the video gradation signal obtained by scaling and offsetting a gradation value of the video based on the dimming mode and the
(Continued)

in-mode level, a current gain output unit that outputs the current gain signal depending on the dimming mode.

5 Claims, 11 Drawing Sheets

(56) References Cited

U.S. PATENT DOCUMENTS

| | | |
|---|---|---|
| 2014/0292831 A1 | 10/2014 | Toyoda |
| 2015/0161926 A1 | 6/2015 | Ogi et al. |
| 2015/0294609 A1 | 10/2015 | Ohyama et al. |

FOREIGN PATENT DOCUMENTS

| | | |
|---|---|---|
| JP | 2014-132295 A | 7/2014 |
| JP | 2014-194493 A | 10/2014 |
| JP | 2014-195184 A | 10/2014 |
| JP | 2015-108750 A | 6/2015 |

OTHER PUBLICATIONS

International Search Report of PCT/JP2017/024527 dated Oct. 3, 2017.

VIDEO DISPLAY DEVICE

TECHNICAL FIELD

The present invention relates to a video display device. The present invention claims priority to Japanese Patent Application No. 2016-135072 filed on Jul. 7, 2016, the contents of which are incorporated in the present application by reference for designated countries where incorporation by reference of documents is permitted.

BACKGROUND ART

Patent Literature 1 discloses "a projector and a head-up display device which are capable of avoiding an instantaneous increase in brightness of projection light when a dimming control of the projection light is performed using a plurality of dimming control means".

CITATION LIST

Patent Literature

Patent Literature 1: JP 2014-195184 A

SUMMARY OF INVENTION

Technical Problem

However, in a method of Patent Literature 1, brightness of a video can be changed by changing transmissivity of a neutral density filter, but there is a problem that the neutral density filter or a driving unit for driving the neutral density filter is required and a video display device is enlarged.

In addition, in order to be able to change the brightness of the video without a user feeling a sense of incongruity, it is important to control an amount of emitted light so that brightness of each gradation value becomes continuous.

Accordingly, an object of the present invention is to provide a technique that can miniaturize a video display device and can gradually change brightness of each gradation value of a video.

Solution to Problem

The present application includes a plurality of means that solve at least some of the abovementioned problems, and an example of these means is as follows. In order to solve the problem, a video display device according to the present invention includes a laser light source unit that changes an amount of emitted light depending on a drive current, a video processing unit that outputs a video gradation signal, a current gain signal, and a current offset signal, a laser driver that outputs the drive current based on the video gradation signal, the current gain signal, and the current offset signal, and a dimming level processing unit that divides a dimming level for designating brightness of a video into a plurality of dimming modes and divides the dimming level into in-mode levels within the divided dimming modes, wherein the video processing unit includes a video gradation value output unit that outputs the video gradation signal obtained by scaling and offsetting a gradation value of the video based on the dimming mode and the in-mode level, a current gain output unit that outputs the current gain signal depending on the dimming mode, and a current offset output unit that outputs the current offset signal depending on the dimming mode.

ADVANTAGEOUS EFFECTS OF INVENTION

According to the present invention, the video display device can be miniaturized, and can gradually change brightness of each gradation value of a video. Objects, configurations, and effects other than those described above will be clarified from a description of embodiments provided below.

DESCRIPTION OF EMBODIMENTS

First Embodiment

Figure 1:
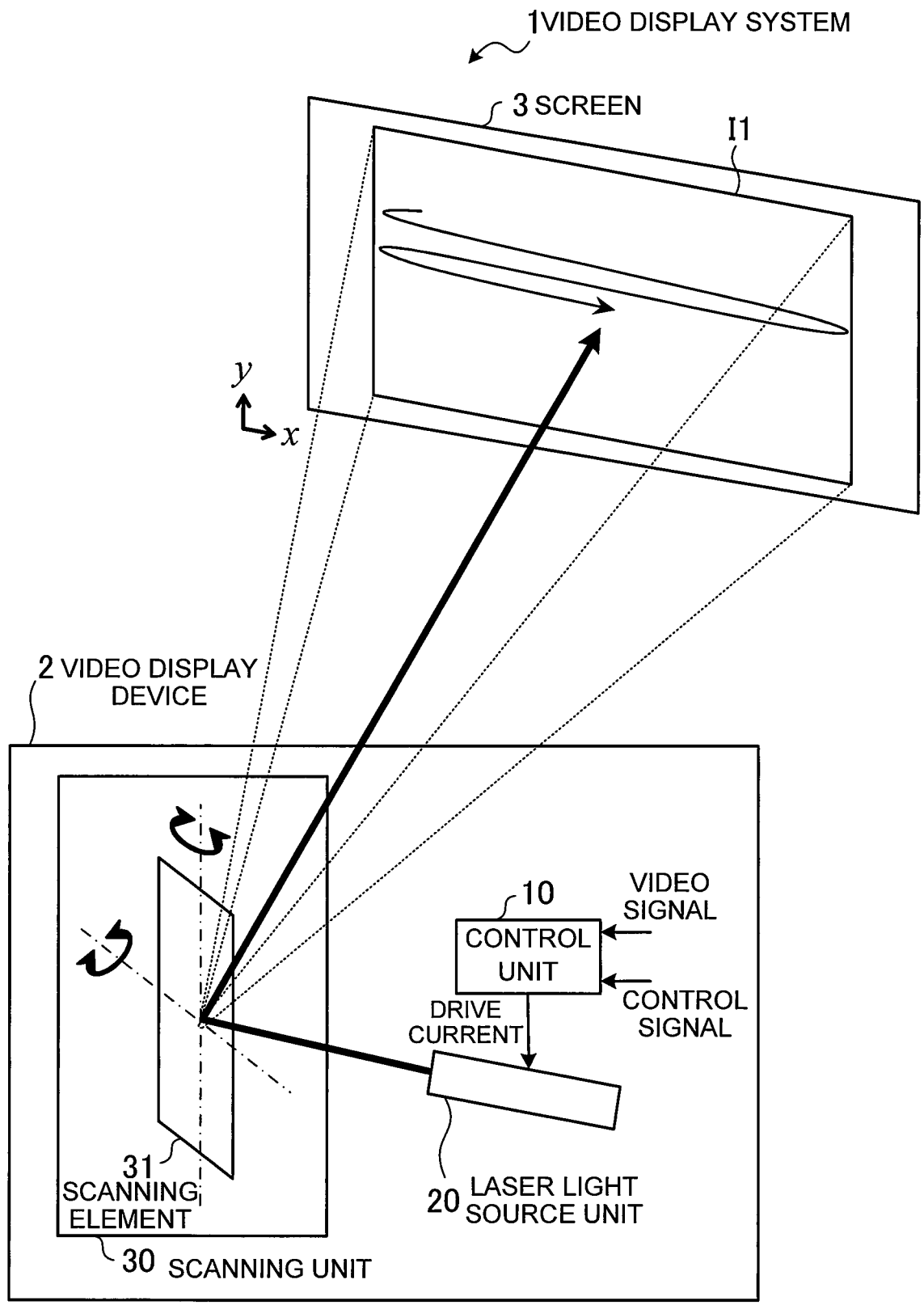
FIG. 1 is a view showing a configuration example of a video display system according to a first embodiment.

Hereinafter, embodiments of the present invention will be described with reference to the drawings. An amount of light emitted by a laser light source is controlled by an amount of current flowing in the laser light source. When a current I flowing in the laser light source is equal to or smaller than a predetermined oscillation threshold value Ith, the laser light source slightly emits light, but an amount of light emitted by the laser light source is very small as compared with a maximum rated output of the laser light source. When the current I is equal to or larger than the oscillation threshold value Ith, the amount of light emitted by the laser light source is substantially proportional to "I-Ith".

As described above, the laser light source has a property that a change in the amount of emitted light with respect to a change in the current becomes large in the case where the current I flowing in the laser light source is equal to or smaller than the oscillation threshold value Ith and the case where the current I flowing in the laser light source is equal to or larger than the oscillation threshold value Ith. That is, the current flowing in the laser light source and the amount of emitted light have a non-linear relationship therebetween.

In a laser scanning type video display device, it is possible to display a video by controlling a current value for driving the laser light source depending on a gradation value of a video to be displayed. Since the current in the laser light source and the amount of emitted light have the non-linear relationship therebetween as described above, in order to allow an output luminance to be a desired output luminance at each gradation value, it is necessary to prepare a table for converting a gradation value to a current value in advance.

In addition, in a video display device according to the present invention described below, an amount ILD of current flowing in the laser light source is set by two kinds of currents such as an offset current and an addition current added to the offset current depending on a video signal. For this reason, when assuming that the offset current is "Ioffset", a gain is "Gain", and a value of a video gradation signal for laser driving is "X", the amount of current ILD flowing in the laser light source is represented by the following Mathematical Formula (1).

$$ILD = Ioffset + Gain \times X \qquad (1)$$

An information amount (the number of bits) expressing X is limited, and the current flowing in the laser light source and the amount of emitted light have the non-linear relationship therebetween as described above. Therefore, by allowing a maximum current capable of displaying a minimum luminance to be displayed to flow as the offset current in the laser light source, it is possible to express a large number of gradations in a current region where the amount of emitted light is greatly changed. The video display device includes a lookup table (hereinafter, also referred to as an LUT) of "Ioffset", an LUT of "Gain", an LUT that converts a gradation value of a video into the video gradation signal for laser driving.

In the video display device, it is preferable that brightness of the video can be changed depending on a use scene. For example, in the case where the laser scanning type video display device is used as an in-vehicle head-up display, in order to be able to visually recognize the video in the daytime and prevent dazzlement at midnight, it is preferable that the brightness of the video can be changed in a wide range. More specifically, considering that the daytime illuminance at fine weather is about 100,000 [lx] and illuminance under a street lamp at night is about 100 [lx], it is preferable that the brightness of the video can be changed in a ratio of 1000:1 or more.

Since the current flowing in the laser light source is changed depending on a brightness level (hereinafter, also referred to as a dimming level) of the displayed video, the above table needs to be changed for each dimming level. In the case where the dimming level displayed by the video display device can be changed in a wide luminance range and in multiple stages, for example, in multiple stages such as 300 stages, it is not preferable to prepare the table described above independently for each dimming level because a processing load of the video display device is high. Therefore, in the present invention, the dimming level is divided into a plurality of groups (hereinafter, referred to as dimming modes) which are a rough luminance range, and a reference table is prepared for each dimming mode. In addition, a table for each dimming level is prepared by correcting a LUT of the reference table.

When the dimming level is gradually changed, the reference table is switched at a timing at which the dimming mode is switched. In particular, the reference table includes the LUT of the offset current, and since a minimum luminance to be displayed is changed depending on the dimming mode, the offset current is also changed. If the laser light source is driven without considering the change in the offset current, when the brightness of the video is gradually changed, the offset current is changed at a timing at which the reference table is changed, such that brightness of a low gradation value is suddenly changed greatly. In order to be able to change the brightness of the video without a user feeling a sense of incongruity, without enlarging the video display device due to addition of a neutral density filter or the like, it is important to control the laser light source so that brightness of each gradation value becomes continuous when the dimming level is gradually changed.

FIG. 1 is a view showing a configuration example of a video display system 1 according to a first embodiment. As shown in FIG. 1, the video display system 1 includes a video display device 2 and a screen 3.

The video display device 2 is a laser scanning type video display device that displays a video by scanning a laser beam onto the screen 3. The video display device 2 includes a control unit 10, a laser light source unit 20, and a scanning unit 30.

A video signal of the video displayed on the screen 3 and a control signal for controlling the video displayed on the screen 3 are input to the control unit 10. The control signal includes, for example, a signal for adjusting brightness of the video. The brightness of the video is designated, for example, by a user. The control unit 10 outputs a drive current corresponding to the video signal and the control signal to the laser light source unit 20.

The drive current output from the control unit 10 is input to the laser light source unit 20. The laser light source unit 20 emits a laser beam corresponding to the input drive current to the scanning unit 30.

The scanning unit 30 includes a scanning element 31. The scanning element 31 has a mirror surface that reflects the laser beam emitted from the laser light source unit 20 to the screen 3.

The mirror surface of the scanning element 31 rotates around two axes and two-dimensionally scans the laser beam onto the screen 3. For example, the mirror surface of the scanning element 31 rotates around a rotation axis (hereinafter, also referred to as a first axis) that scans the laser beam onto the screen 3 in a y direction (vertical direction) and a rotation axis (hereinafter, also referred to as a second axis) that scans the laser beam onto the screen 3 in an x direction (horizontal direction). The first axis and the second axis are, for example, orthogonal to each other.

Here, a frame rate of the video displayed on the screen 3 is "f", the number of pixels in a frame in the x direction is "H", and the number of pixels in the frame in the y direction is "V". The scanning unit 30 rotates the first axis (axis for scanning in the y direction) of the scanning element 31 to scan the laser beam once in the y direction during one frame period "1/f". In addition, the scanning unit 30 rotates the second axis (axis for scanning in the x direction) of the scanning element 31 to scan the laser beam V times in the x direction during one frame period "1/f". Scanning timings in the y direction and the x direction are synchronized with a video signal for modulating the laser beam of the laser light source unit 20.

In this manner, the video display device 2 performs scanning of one frame having H pixels in the x direction and V pixels in the y direction, and repeats scanning for this one frame. As a result, a video I1 corresponding to the video signal is displayed on the screen 3.

It should be noted that one or both of the first axis and the second axis of the scanning element 31 may rotate in only one direction (for example, only in the right direction) and may repeatedly rotate in both directions depending on a scanning pattern on the screen 3 (for example, repeat left rotation and right rotation at an angle less than 360°).

In addition, in FIG. 1, the scanning unit 30 includes the scanning element 31, but the scanning unit 30 is not limited thereto. For example, the scanning unit 30 may include two scanning elements each having a mirror surface, and each of the two scanning elements may have one rotation axis. These two rotation axes correspond to the first and second axes described above, and the respective mirror surfaces of the two scanning elements scan the laser beam in the y direction and the x direction onto the screen 3 by rotation.

Figure 2:
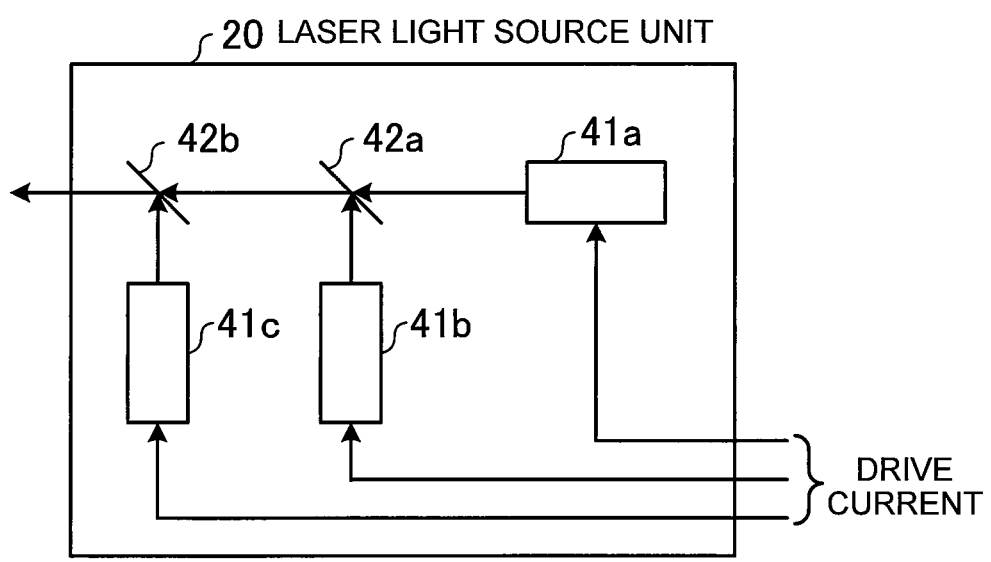
FIG. 2 is a block diagram showing a configuration example of a laser light source unit.

FIG. 2 is a block diagram showing a configuration example of the laser light source unit 20. As shown in FIG. 2, the laser light source unit 20 includes laser light sources 41a, 41b, and 41c and dichroic mirrors 42a and 42b. Hereinafter, when it is not necessary to distinguish the laser light sources 41a, 41b, and 41c from one another, the laser light sources 41a, 41b, and 41c are collectively referred to as a laser light source 41.

The laser light sources 41a, 41b, and 41c are, for example, laser diodes (LD). The laser light sources 41a, 41b, and 41c emit laser beams by a drive current output from the control unit 10 shown in FIG. 1.

The laser light sources 41a, 41b, and 41c emit laser beams of different colors, respectively. For example, the laser light source 41a emits a laser beam of "red (R)", the laser light source 41b emits a laser beam of "green (G)", and the laser light source 41c emits a laser beam of "blue (B)". It should be noted that any one of the laser light sources 41a, 41b, and 41c may emit a laser beam of any one of colors.

The dichroic mirrors 42a and 42b combine the laser beams emitted from the laser light source 41 with each other. The laser light source 41 and the dichroic mirrors 42a and 42b are arranged so that the laser beams of three colors travel in substantially the same direction on substantially the same optical axis.

In the above description, the laser light source unit 20 performs a full-color display of the video I1 using the laser beams of the three colors ("R, G, and B"), but is not limited thereto. The laser light source unit 20 may display the video I1 using a laser beam of one color or laser beams of two colors by simplifying an optical system. Alternatively, the laser light source unit 20 may use a plurality of laser light sources per color in order to increase a light output intensity.

Figure 3:
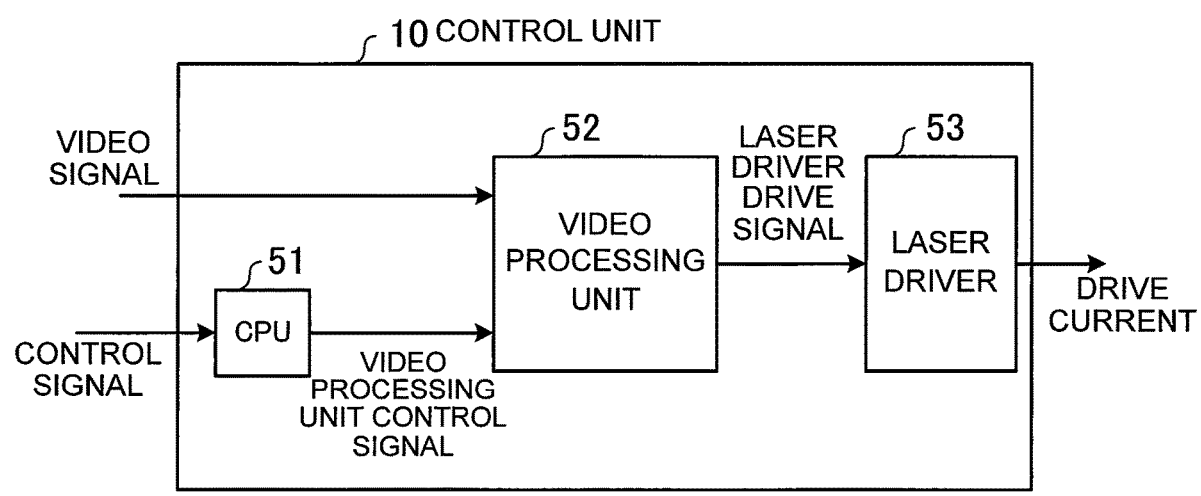
FIG. 3 is a block diagram showing a configuration example of a control unit.

FIG. 3 is a block diagram showing a configuration example of the control unit 10. As shown in FIG. 3, the control unit 10 includes a central processing unit (CPU) 51, a video processing unit 52, and a laser driver 53.

The control signal is input to the CPU 51. The CPU 51 generates a video processing unit control signal for controlling an operation of the video processing unit 52 based on the input control signal. The CPU 51 outputs the generated video processing unit control signal to the video processing unit 52.

The video signal is input to the video processing unit 52. The video signal includes a gradation value of the video. The gradation value is, for example, an integer from 0 to 255. The gradation value is not limited to a value in the range described above. In addition, the gradation value may be a real number.

The video processing unit 52 generates a laser driver drive signal based on the video signal and the video processing unit control signal output from the CPU 51. The laser driver drive signal includes a video gradation signal, a current gain signal, and a current offset signal, as described below. The video processing unit 52 outputs the generated laser driver drive signal to the laser driver 53.

The laser driver 53 generates a drive current based on the laser driver drive signal output from the video processing unit 52. The laser driver 53 outputs the generated drive current to the laser light source unit 20. The laser light source unit 20 emits light with an emission intensity corresponding to the drive current output from the laser driver 53.

Figure 4:
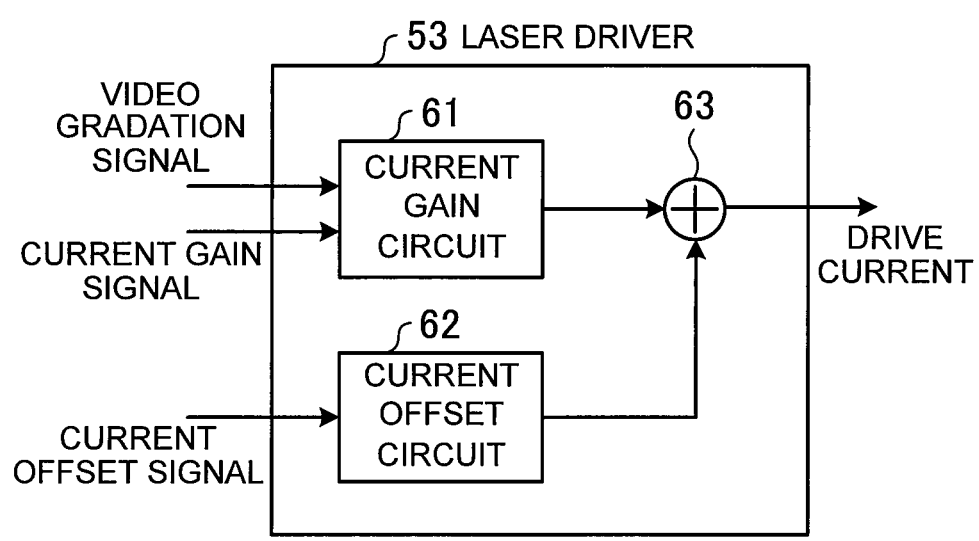
FIG. 4 is a block diagram showing a configuration example of a laser driver.

FIG. 4 is a block diagram showing a configuration example of the laser driver 53. As shown in FIG. 4, the laser driver 53 includes a current gain circuit 61, a current offset circuit 62, and a current addition circuit 63. The laser driver 53 sets a current amount of the drive current flowing in the laser light source unit 20 by two kinds of currents, that is, an offset current and a current added to the offset current depending on the video signal.

The laser driver 53 receives the video gradation signal, the current gain signal, and the current offset signal as the laser driver drive signal (see FIG. 3) from the video processing unit 52. In the following, it is described that the video gradation signal is an integer from 0 or more to 1023 or less, but the present invention is not limited thereto, and the video gradation signal may be an integer in another range, such as an integer from 0 or more to 255 or less or may be a real number.

The current offset circuit 62 determines a lower limit current (offset current) flowing in the laser light source unit 20 based on the current offset signal.

The current gain circuit 61 determines an addition current with respect to the offset current based on the video gradation signal and the current gain signal. The addition current is, for example, a current proportional to the product of a value of the video gradation signal and a value of the current gain signal.

The current addition circuit 63 adds the offset current and the addition current to each other, and outputs an addition result as the drive current of the laser light source unit 20. Assuming that the offset current output from the current offset circuit 62 is "Ioffset", the value of the current gain signal is "Gain", and the value of the video gradation signal is "X", the drive current is represented by the above Mathematical Formula (1). The laser driver 53 outputs the drive current represented by the Mathematical Formula (1) to the laser light source unit 20.

Figure 5:
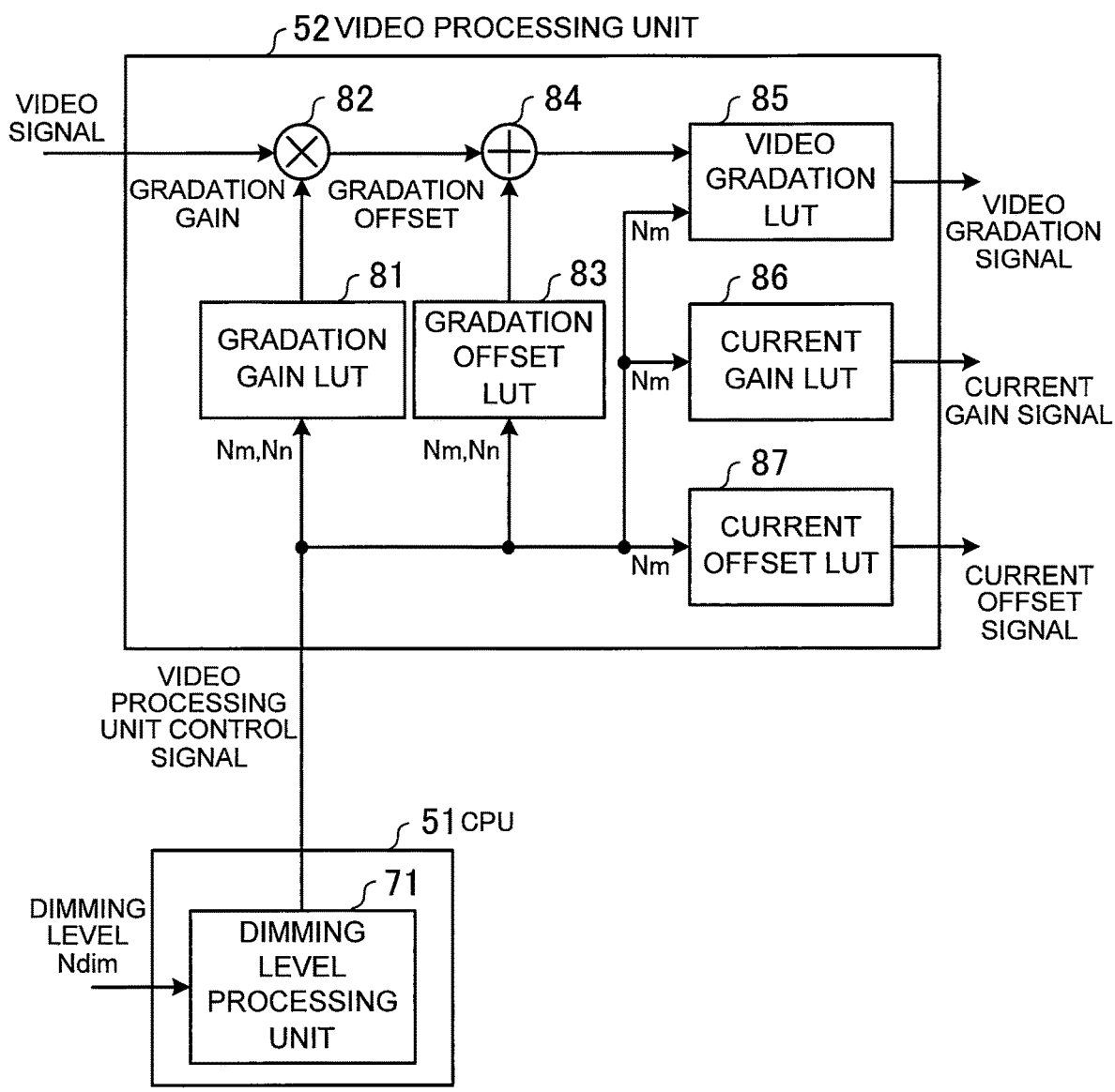
FIG. 5 is a block diagram showing a configuration example of a video processing unit.

FIG. 5 is a block diagram showing a configuration example of the video processing unit 52. As shown in FIG. 5, the video processing unit 52 includes a gradation gain LUT 81, a gradation gain multiplication circuit 82, a gradation offset LUT 83, a gradation offset addition circuit 84, a video gradation LUT 85, a current gain LUT 86, and a current offset LUT 87. The video processing unit 52 outputs the video gradation signal, the current gain signal, and the current offset signal as the laser driver drive signal (see FIG. 3). In addition, FIG. 5 also shows the CPU 51. The CPU 51 includes a dimming level processing unit 71.

The CPU 51 receives a control signal including a dimming level Ndim from the outside. The dimming level Ndim included in the control signal is, for example, an integer from 0 to 299, and the smaller the value of the dimming level Ndim, the larger the output luminance of the video display device 2. That is, assuming that an output luminance of a maximum gradation value (the gradation value of the video signal=255) of the video when the dimming level Ndim is i is L(i), L(i+1)/L(i)≤1. In addition, L(i) is set so that a value of L(i+1)/L(i) is larger than a predetermined value.

The dimming level processing unit 71 calculates a dimming mode Nm and an in-mode level Nn from the received dimming level Ndim (for example, 0 to 299). Here, the dimming mode Nm is a value representing a rough range of the output luminance of the video display device 2, and takes values of, for example, 0, 1, and 2. The dimming mode Nm indicates that the output luminance of the video display device 2 increases as a value of the dimming mode decreases.

The in-mode level Nn is a value for finely setting the output luminance of the video display device 2 within a luminance range indicated by the dimming mode Nm, and takes an integer from 0 to 99, for example. The dimming level processing unit 71 calculates the dimming mode Nm and the in-mode level Nn by the following Mathematical Formulas (2) and (3).

$$Nm=\text{Floor}[N\text{dim}/100] \quad (2)$$

$$Nn=N\text{dim}-100\times Nm \quad (3)$$

Here, Floor[x] is an integer less than or equal to x. That is, the dimming level Ndim is divided into a plurality of dimming modes Nm, and is divided into in-mode levels Nn within the divided dimming modes Nm. The CPU 51 transmits the calculated dimming mode Nm and in-mode level Nn to the video processing unit 52.

The video processing unit 52 calculates the video gradation signal as follows using the video signal and the dimming mode Nm and the in-mode level Nn received from the CPU 51.

First, the video processing unit 52 determines a gradation gain by the gradation gain LUT 81, using the dimming mode Nm and the in-mode level Nn as arguments. The gradation gain indicates a ratio of scaling the gradation value of the video signal.

The gradation gain multiplication circuit 82 multiplies the video signal by the gradation gain output from the gradation gain LUT 81, and outputs a multiplication result as a gain multiplied gradation value.

Next, the video processing unit 52 determines a gradation offset by the gradation offset LUT 83, using the dimming mode Nm and the in-mode level Nn as arguments. The gradation offset indicates an amount of predetermined offset added to the gain multiplied gradation value.

The gradation offset addition circuit 84 adds the gain multiplied gradation value and the gradation offset to each other, and calculates an addition result as an offset added gradation value.

Further, the video processing unit 52 determines the video gradation signal by the video gradation LUT 85 from the dimming mode Nm and the offset added gradation value. Here, the video gradation LUT 85 is an LUT that converts the offset added gradation value set for each dimming mode Nm into the video gradation signal "X". As a result, the gradation value of the video signal and an amount of emitted light are corrected to have a substantially linear relationship therebetween.

The video processing unit 52 calculates the current gain signal and the current offset signal, in addition to the calculation of the video gradation signal described above. Specifically, the video processing unit 52 determines the current gain signal by the current gain LUT 86, using the dimming mode Nm as an argument. In addition, the video processing unit 52 determines the current offset signal by the current offset LUT 87, using the dimming mode Nm as an argument.

Here, the current gain LUT 86 is an LUT that converts the dimming mode Nm into the current gain signal. For example, the current gain LUT 86 outputs a current gain signal of "gain 0" which is any positive value when Nm=0, outputs a current gain signal of "gain 1" which is any positive value when Nm=1, and outputs a current gain signal of "gain 2" which is any positive value when Nm=2.

In addition, the current offset LUT 87 is an LUT that converts the dimming mode Nm into the current offset signal. For example, the current offset LUT 87 outputs a current offset signal of "offset 0" which is any positive value when Nm=0, outputs a current offset signal of "offset 1" which is any positive value when Nm=1, and outputs a current offset signal of "offset 2" which is any positive value when Nm=2.

Figure 6:
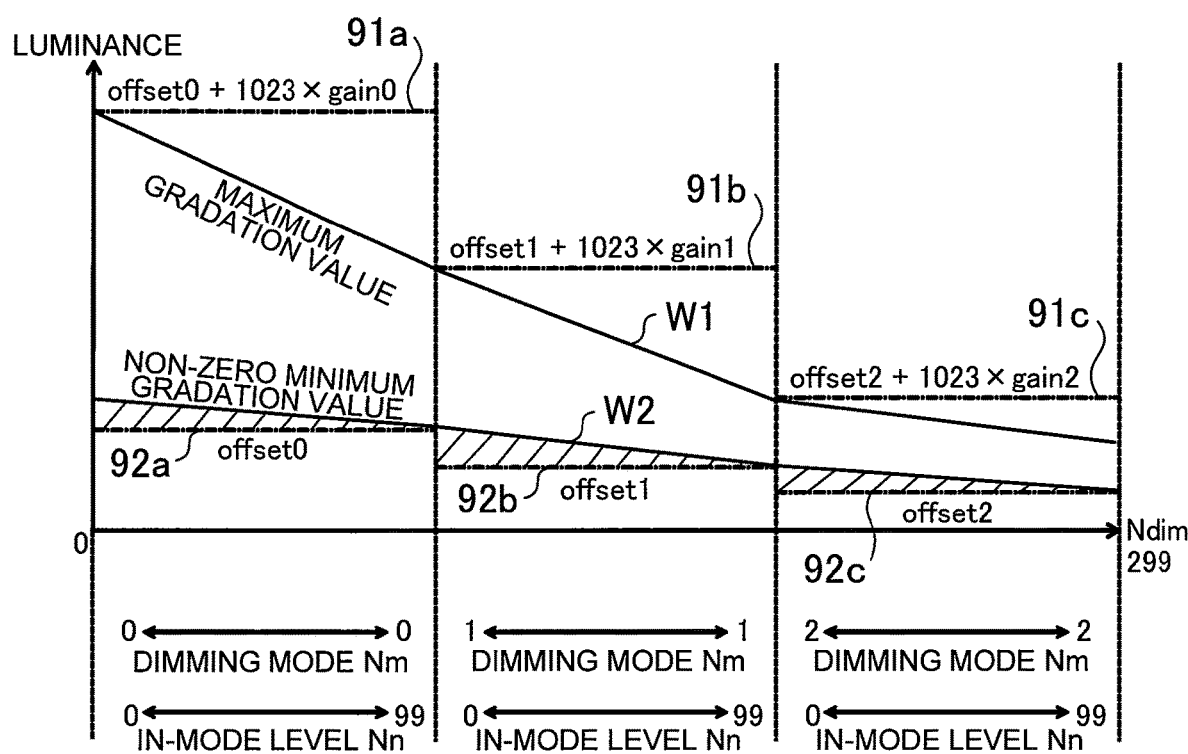
FIG. 6 is a graph showing output luminance of a maximum gradation value of a video signal and a minimum gradation value that is not 0 with respect to a dimming level.

FIG. 6 is a graph showing an output luminance of a maximum gradation value (gradation value=255) of the video signal and a minimum gradation value (gradation value=1 and hereinafter referred to as non-zero minimum gradation value) of the video signal that is not 0, with respect to the dimming level Ndim. A horizontal axis shown in FIG. 6 indicates the dimming level Ndim, and a vertical axis shown in FIG. 6 indicates luminance of the light output from the laser light source unit 20.

As shown in FIG. 6, the dimming level Ndim of "0 to 299" is divided into the dimming modes Nm of "0, 1, and 2 and the in-mode levels Nn of "0 to 99". The output luminance when the video signal has the maximum gradation value (255) decreases as the dimming mode Nm increases and as the in-mode level Nn increases, as shown by a waveform W1. In addition, the output luminance when the video signal has the non-zero minimum gradation value (1) also decreases as the dimming mode Nm increases and as the in-mode level Nn increases, as shown by a waveform W2.

A height of each of three triangles represented by hatching in FIG. 6 at the dimming level Ndim is determined by the gradation offset output from the gradation offset LUT 83 in FIG. 5. A value of the gradation offset is determined by the dimming mode Nm and the in-mode level Nn as described in FIG. 5. The value of the gradation offset decreases as the in-mode level Nn increases (for example, the height of each of the three triangles at the dimming level Ndim decreases as the in-mode level Nn increases).

A value of the gradation gain output from the gradation gain LUT 81 is determined by the dimming mode Nm and the in-mode level Nn as described in FIG. 5. The value of the gradation gain decreases as the in-mode level Nn increases.

For example, the value of the gradation gain when Nm=0 and Nn=0 is a value smaller than "4" and close to "4". The video gradation signal "X" output from the video gradation LUT 85 when Nm=0 and Nn=0 at the maximum gradation value (255) is a value obtained by adding the value of the gradation offset LUT 83 when Nm=0 and Nn=0 to a multiplication value between the maximum gradation value (255) and the gradation gain (value close to "4" described above), and is a value corrected by the video gradation LUT 85. In addition, the value of the gradation gain when Nm=0 and Nn=99 is, for example, a value smaller than "2". That is, the value of the gradation gain changes from the value smaller than "4" and close to "4" to the value smaller than "2" as Nn increases, for example, when Nm=0. Similarly, the value of the gradation gain decreases as the in-mode level Nn increases when Nm=1 and 2.

A value of the current gain signal output from the current gain LUT 86 in FIG. 5 is determined by the dimming mode Nm as described in FIG. 5. In an example of FIG. 6, the value of the current gain signal is "gain 0" when Nm=0, is "gain 1" when Nm=1, and is "gain 2" when Nm=2.

A value of the current offset signal output from the current offset LUT 87 in FIG. 5 is determined by the dimming mode Nm as described in FIG. 5. In the example of FIG. 6, the value of the current offset signal is "offset 0" when Nm=0, is "offset 1" when Nm=1, and is "offset 2" when Nm=2.

The current gain signal and the current offset signal are determined by the dimming mode Nm, as described above. Therefore, if the dimming modes Nm are the same as each other, each of output luminance 91a, 91b, and 91c when the video gradation signal "X" is "1023" is constant regardless of the in-mode level Nn.

In addition, the current offset signal is determined by the dimming mode Nm as described above. Therefore, if the dimming modes Nm are the same as each other, each of output luminance 92a, 92b, and 92c when the offset current determined by the current offset signal flows in the laser light source unit 20 is constant regardless of the in-mode level Nn.

The current offset signal is set so that an output luminance 92 is equal to or lower than a desired output luminance of a non-zero minimum gradation value (1) of a maximum in-mode level "Nn=99" in each dimming mode. As a result, it is possible to output the light with a minimum luminance within each dimming mode.

In addition, the current gain signal is set so that an output luminance 91 is equal to or higher than a desired output luminance of a maximum gradation value (255) of a minimum in-mode level "Nn=0" in each dimming mode. Preferably, the current gain signal is set so that the output luminance 91 is equal to the desired output luminance of the maximum gradation value (255) of the minimum in-mode level "Nn=0" in each dimming mode. As a result, it is possible to output the light with a maximum luminance within each dimming mode.

By dividing the dimming level Ndim into the plurality of dimming modes Nm and setting the current offset signal and the current gain signal in each dimming mode Nm, it is possible to make a difference between a video gradation signal of the maximum gradation value (255) and a video gradation signal of the non-zero minimum gradation value (1) of the video signal at each dimming level equal to or larger than a predetermined value. In addition, it is possible to make the number of gradations that can be expressed at each dimming level equal to or larger than a predetermined number.

In addition, an amount of information (the number of bits) expressing the video gradation signal is limited. In addition, the current flowing in the laser diode and the amount of emitted light have the non-linear relationship therebetween as described above. For this reason, by setting a maximum current offset signal in each dimming mode in a range where the light can be output with the minimum luminance in each dimming mode, it is possible to express a large number of gradations in a current region where the amount of emitted light is greatly changed.

The laser diode emits the light regardless of whether or not the current flowing in the laser diode is equal to or larger than an oscillation threshold value. Accordingly, the laser diode emits the light by the flow of the offset current determined by the current offset signal, and the current offset signal is changed depending on the dimming mode. Therefore, the output luminance when the offset current flows in the laser light source unit 20 is changed depending on the dimming mode. In addition, since the current gain signal and the current offset signal are changed depending on the dimming mode, an output luminance when the video gradation signal is "1023" is changed depending on the dimming mode.

When the dimming level is gradually changed, in order for brightness of each gradation value of the video to be gradually changed without being suddenly changed greatly, the video processing unit 52 sets the gradation offset and the gradation gain as follows.

A gradation offset with respect to the maximum in-mode level "Nn=99" of each dimming mode is set to a value smaller than a predetermined value. Preferably, the gradation offset with respect to the maximum in-mode level "Nn=99" in each dimming mode is set to 0. In addition, a gradation gain with respect to the maximum in-mode level "Nn=99" of each dimming mode is set so that the output luminance of the maximum gradation value (gradation value=255) determined by the gradation gain and the gradation offset becomes a desired output luminance.

A gradation offset with respect to the minimum in-mode level (Nn=0) when the dimming mode Nm=1 and the dimming mode Nm=2 is set so that an output luminance of a non-zero minimum gradation value (gradation value=1) at each dimming level Ndim is equal (approximately equal, which is also applied to the following description) to an output luminance of a non-zero minimum gradation value (gradation value=1) at the maximum in-mode level (Nn=99) when the dimming mode Nm=0 and the dimming mode Nm=1. A gradation offset with respect to the minimum in-mode level (Nn=0) when the dimming mode Nm=0 is set to a predetermined value. In addition, a gradation gain with respect to the minimum in-mode level (Nn=0) of each dimming mode is set so that the output luminance of the maximum gradation value (gradation value=255) determined by the gradation gain and the gradation offset becomes a desired output luminance.

Assuming that the value of the gradation offset corresponding to the in-mode level Nn of the dimming mode Nm is Off(Nm, Nn), when 0≤Nn≤98, Off(Nm, Nn) is set so that Abs[Off(Nm, Nn+1)−Off(Nm, Nn)] is smaller than a predetermined value. Here, Abs [x] is an absolute value of x.

For example, it is possible to set Off(Nm, Nn+1) so that Abs[Off(Nm, Nn+1)−Off(Nm, Nn)] becomes a constant (approximately constant, which is applied to the following description) value regardless of the in-mode level Nn. Alternatively, it is possible to set Off(Nm, Nn+1) so that Off(Nm, Nn+1)/Off(Nm, Nn) becomes a constant value regardless of the in-mode level Nn.

In addition, when 1≤Nn≤98, the value of the gradation gain corresponding to the in-mode level Nn of the dimming mode Nm is set so that the output luminance of the maximum gradation value (255) of the video determined by the gradation gain and the gradation offset becomes a desired output luminance.

Due to the setting of the gradation offset and the gradation gain described above, when the dimming level Ndim is gradually changed, the output luminance of the maximum gradation value (255) and the non-zero minimum gradation value (1) of the video are gradually changed without being suddenly changed greatly. In the case where gamma correction of an output light intensity with respect to the gradation value of the video signal is "γ=1", due to the setting of the gradation offset and the gradation gain described above, even though the gradation value of the video is an integer other than 1 or 255, the output luminance is gradually changed without being suddenly changed greatly. In the case where the gamma correction is "γ≠1", due to non-linearity of a gamma correction function, when the gradation value of the video is other than 1 or 255, a jump occurs in the output luminance. Therefore, it is preferable to correct the gradation value so that such a jump disappears.

Figure 7:
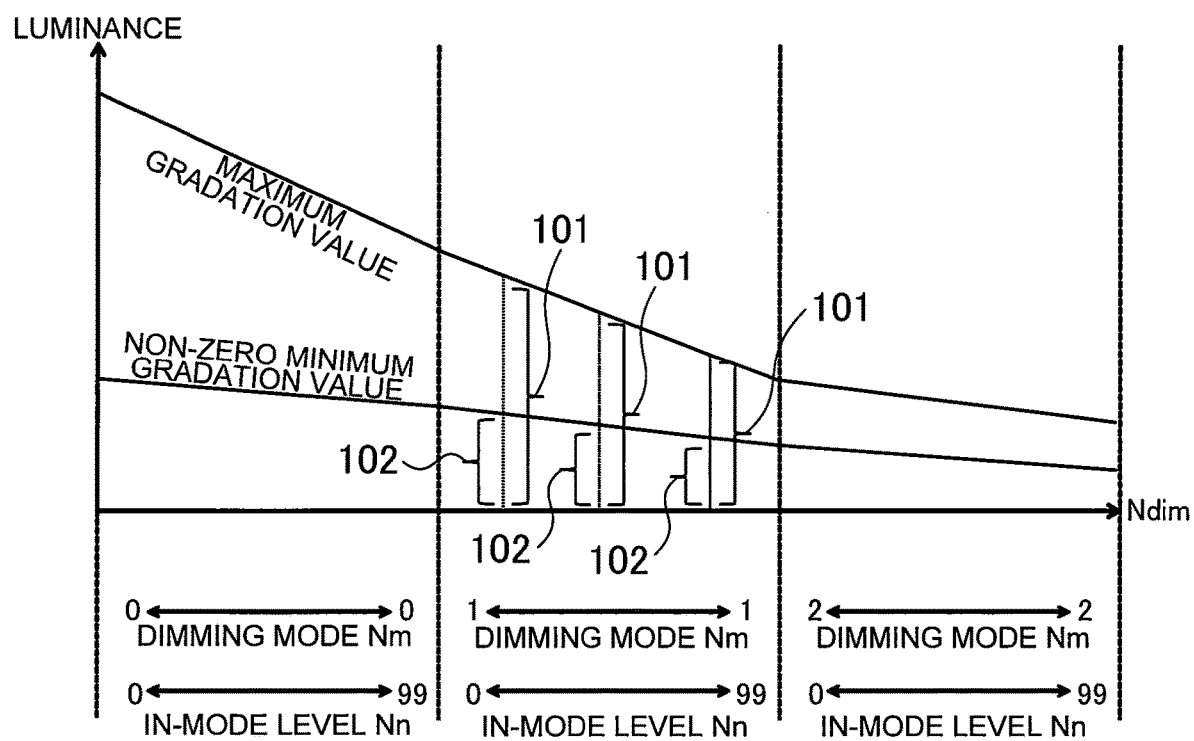
FIG. 7 is a diagram showing another method of setting a gradation offset and a gradation gain corresponding to an in-mode level of a dimming mode.

FIG. 7 is a diagram showing another method of setting a gradation offset and a gradation gain corresponding to the in-mode level Nn of the dimming mode Nm. It is assumed that an output luminance 101 of a maximum gradation value and an output luminance 102 of a non-zero minimum gradation value at the in-mode level Nn of the dimming mode Nm are Lmax(Nm, Nn) and Lmin(Nm, Nn). The gradation offset and the gradation gain are set so that the output luminance 101 of the maximum gradation value becomes a desired output luminance and Lmax(Nm, Nn)/Lmin(Nm, Nn) is constant irrespective of the dimming mode Nm and the in-mode level Nn, in each in-mode level Nn of each dimming mode Nm.

As a result, when the dimming level Ndim is gradually changed, it is possible to gradually change the output luminance of each gradation value of the video without suddenly changing greatly the output luminance of each gradation value of the video while keeping Lmax(Nm, Nn)/Lmin(Nm, Nn) constant.

Figure 8:
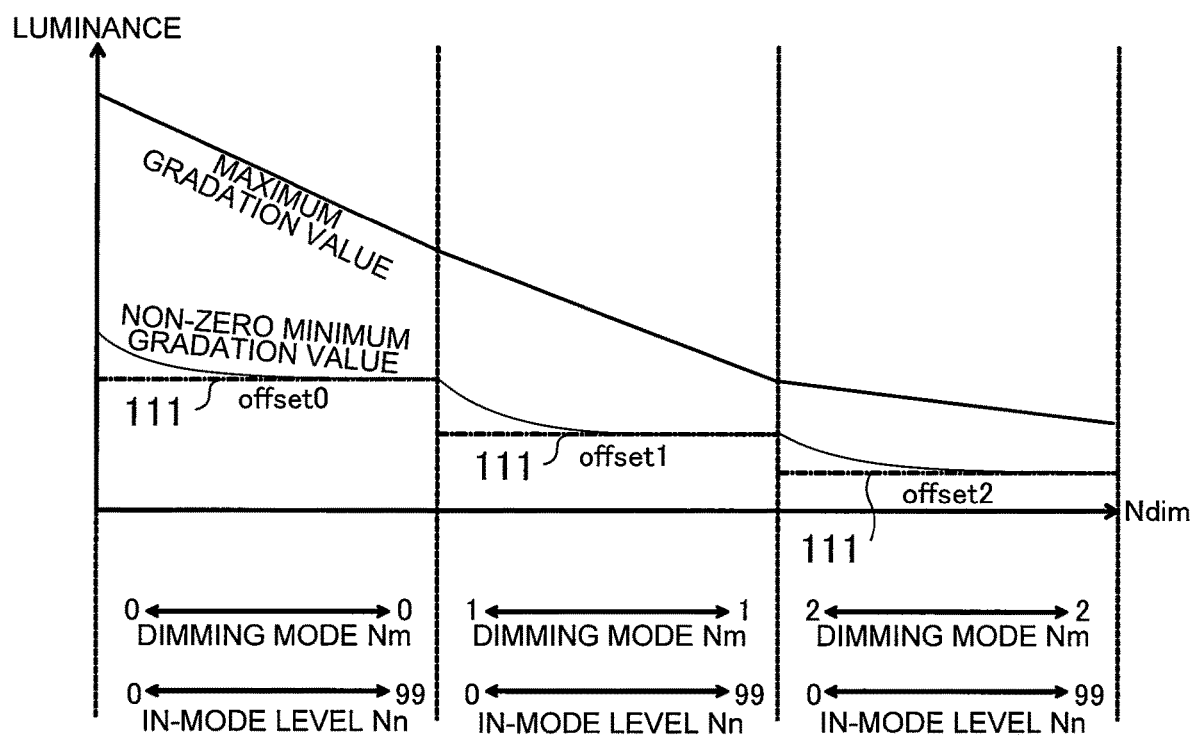
FIG. 8 is a diagram showing another method of setting a gradation offset and a gradation gain corresponding to an in-mode level of a dimming mode.

FIG. 8 is a diagram showing another method of setting a gradation offset and a gradation gain corresponding to the in-mode level Nn of the dimming mode Nm. When k=0 or 1, the gradation offset and the gradation gain are set so that luminance of a maximum gradation value at an in-mode level "99" of a dimming mode "k" and luminance of a maximum gradation value at an in-mode level "0" of a dimming mode "k+1" are equal to each other and luminance of a non-zero minimum gradation value at the in-mode level "99" of the dimming mode "k" and luminance of a non-zero minimum gradation value at the in-mode level "0" of the dimming mode "k+1" are equal to each other. In addition, in each dimming mode, the gradation offset is set so that luminance of the non-zero minimum gradation value continuously and rapidly, for example, exponentially converges to an output luminance 111 as the in-mode level increases from 0.

As a result, it is possible to gradually change the output luminance of each gradation value of the video without suddenly changing greatly the output luminance of each gradation value of the video while increasing the number of expressible gradations at in-mode levels other than 0 or 99.

As described above, the video display device 2 includes the laser light source unit 20 that changes the amount of emitted light depending on the drive current, the video processing unit 52 that outputs the video gradation signal, the current gain signal, and the current offset signal, the laser driver 53 that outputs the drive current based on the video gradation signal, the current gain signal, and the current offset signal, and the dimming level processing unit 71 that divides the dimming level Ndim for designating the brightness of the video into the plurality of dimming modes Nm and divides the dimming level into the in-mode levels Nn within the divided dimming modes Nm. The video processing unit 52 includes the gradation gain LUT 81, the gradation gain multiplication circuit 82, the gradation offset LUT 83, and the gradation offset addition circuit 84 that output the video gradation signal obtained by scaling and offsetting the gradation value of the video based on the dimming mode Nm and the in-mode level Nn, the current gain LUT 86 that output the current gain signal depending on the dimming mode Nm, and the current offset LUT 87 that outputs the current offset signal depending on the dimming mode Nm.

As a result, the video display device 2 can be miniaturized, and can gradually change the brightness of each gradation value of the video. For example, the video display device 2 does not need a neutral density filter for adjusting the brightness and a drive unit for driving the neutral density filter.

In addition, the gradation offset LUT 83 sets an amount of gradation offset with respect to the brightest in-mode level of a first dimming mode to be equal to or larger than an amount of gradation offset with respect to the darkest in-mode level of a second dimming mode brighter than the first dimming mode. For example, in FIG. 6, the gradation offset LUT 83 sets an amount of gradation offset (height of the triangle represented by hatching) with respect to the in-mode level "Nn=0" of the dimming mode "Nm=1" to be equal to or larger than an amount of gradation offset with respect to the in-mode level "Nn=99" of the dimming mode "Nm=0". As a result, the video display device 2 can be miniaturized, and can gradually change the brightness of each gradation value of the video.

In addition, the gradation offset LUT 83 sets an amount of gradation offset with respect to a second in-mode level of the same dimming mode as a dimming mode including a first in-mode level to be equal to or smaller than an amount of gradation offset with respect to the first in-mode level, the second in-mode level being darker than the first in-mode level. For example, the gradation offset LUT 83 sets an amount of gradation offset with respect to the in-mode level "Nn=50" of the dimming mode "Nm=1" to be equal to or smaller than an amount of gradation offset with respect to the in-mode level "Nn=49" of the dimming mode "Nm=1". As a result, the video display device 2 can be miniaturized, and can gradually change the brightness of each gradation value of the video.

In addition, the gradation gain LUT 81 sets a magnification of the scaling with respect to the second in-mode level of the same dimming mode as the dimming mode including the first in-mode level to be equal to or smaller than a magnification of the scaling with respect to the first in-mode level, the second in-mode level being darker than the first in-mode level. For example, the gradation gain LUT 81 sets an amount of gradation gain with respect to the in-mode level "Nn=50" of the dimming mode "Nm=1" to be equal to or smaller than an amount of gradation gain with respect to the in-mode level "Nn=49" of the dimming mode "Nm=1". As a result, the video display device 2 can be miniaturized, and can gradually change the brightness of each gradation value of the video.

In the above description of the video processing unit 52, it has been described that the video processing unit 52 determines the gradation gain, the gradation offset, the video gradation signal, the current gain signal, and the current offset signal using the LUTs, but the present invention is not limited thereto. The video processing unit 52 may calculate at least one of the gradation gain, the gradation offset, the video gradation signal, the current gain signal, and the current offset signal by four fundamental arithmetic operations or the like, without using the LUTs.

Second Embodiment

In a second embodiment, a part of light emitted from a laser light source unit 20 is detected by a photodetector. A video display device 2 corrects a laser driver drive signal by a video processing unit 52 based on a detection result of the photodetector. As a result, even though characteristics of the laser light source unit 20 are changed, it is possible to change brightness of a video with high accuracy.

Figure 9:
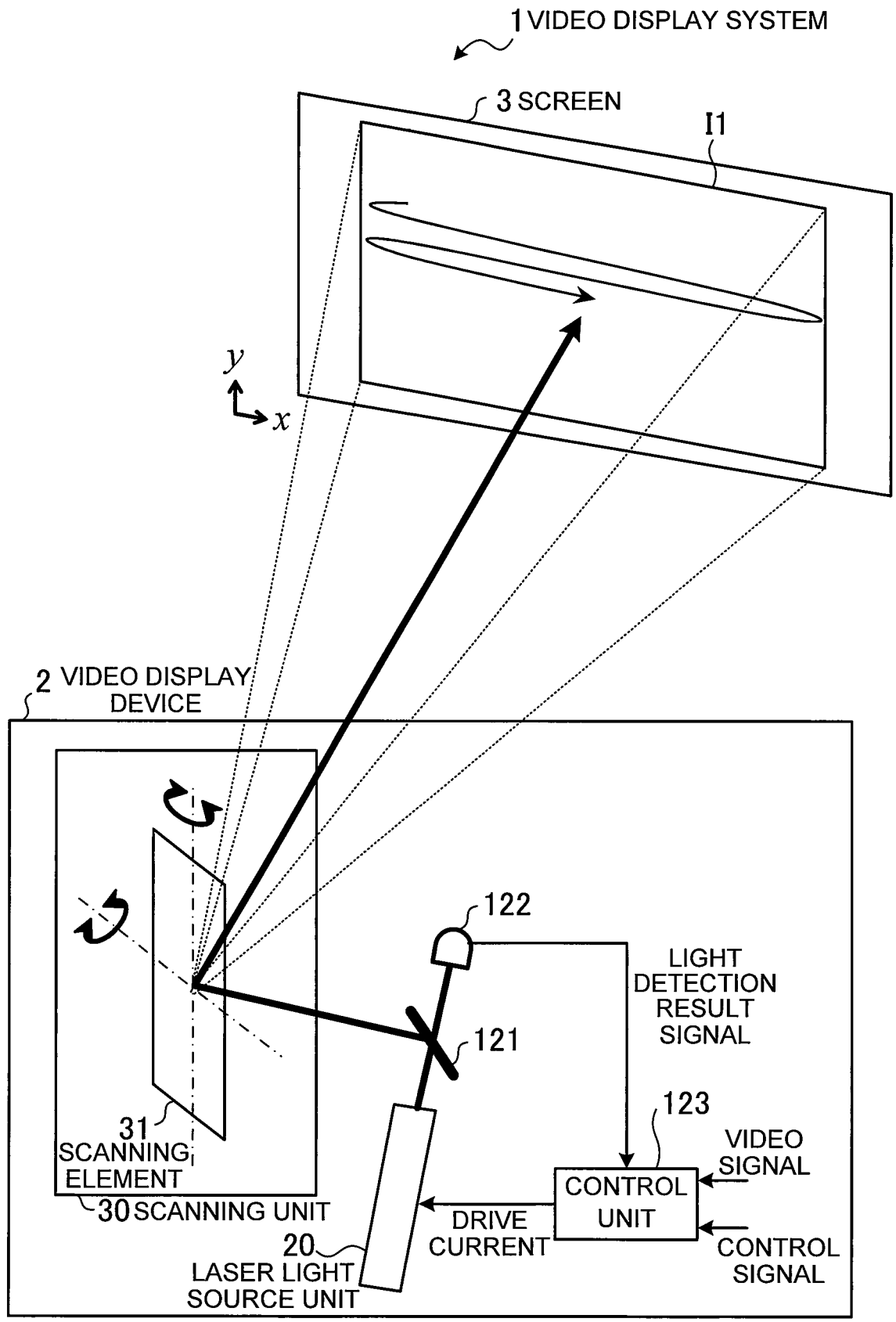
FIG. 9 is a view showing a configuration example of a video display system according to a second embodiment.

FIG. 9 is a view showing a configuration example of a video display system 1 according to a second embodiment. In FIG. 9, the same reference numerals are given to the same components as those in FIG. 1. The video display system 1 in FIG. 9 includes a beam splitter 121, a photodetector 122, and a control unit 123, as compared with FIG. 1.

The beam splitter 121 reflects a part of light emitted from the laser light source unit 20, and transmits the remaining part of the light therethrough.

The photodetector 122 detects an intensity of a laser beam transmitted through the beam splitter 121, and outputs a light detection result signal indicating the detected intensity of the laser beam to the control unit 123.

The control unit 123 corrects a laser driver drive signal to be described below based on the light detection result signal detected by the photodetector 122.

Figure 10:
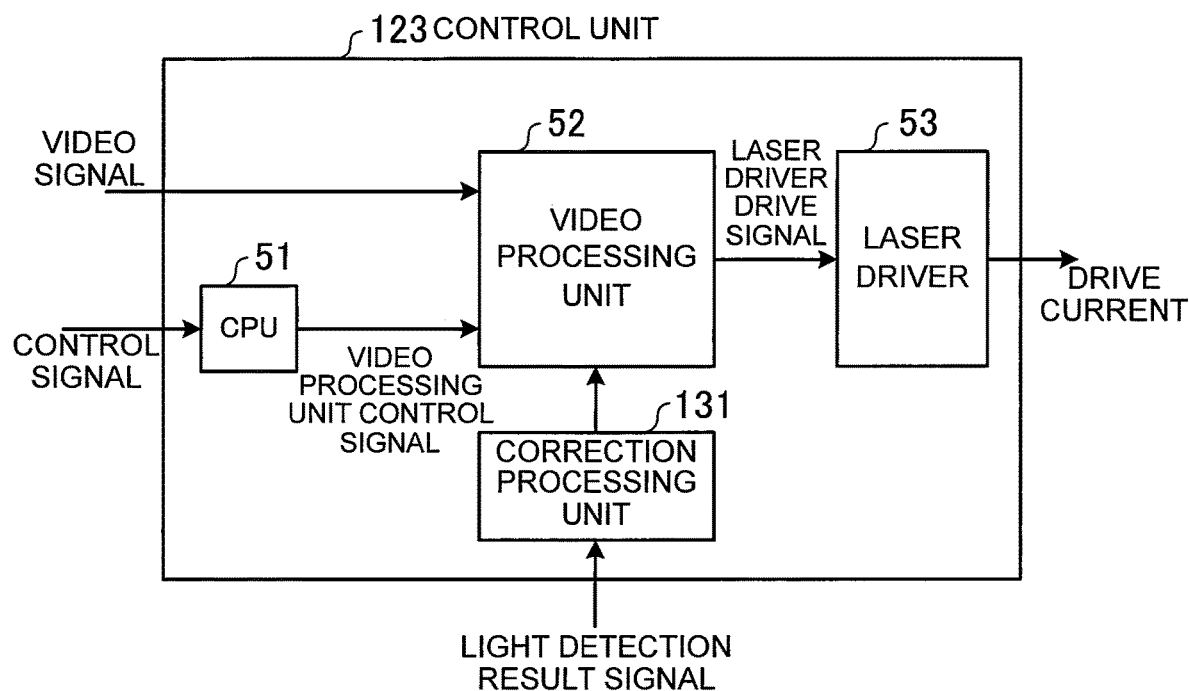
FIG. 10 is a block diagram showing a configuration example of a control unit.

FIG. 10 is a block diagram showing a configuration example of the control unit 123. In FIG. 10, the same reference numerals are given to the same components as those in FIG. 3. The control unit 123 further includes a correction processing unit 131, as compared with the control unit 10 shown in FIG. 3.

The light detection result signal output from the photodetector 122 is input to the correction processing unit 131. The correction processing unit 131 corrects the laser driver drive signal output from the video processing unit 52 based on the light detection result signal.

Figure 11:
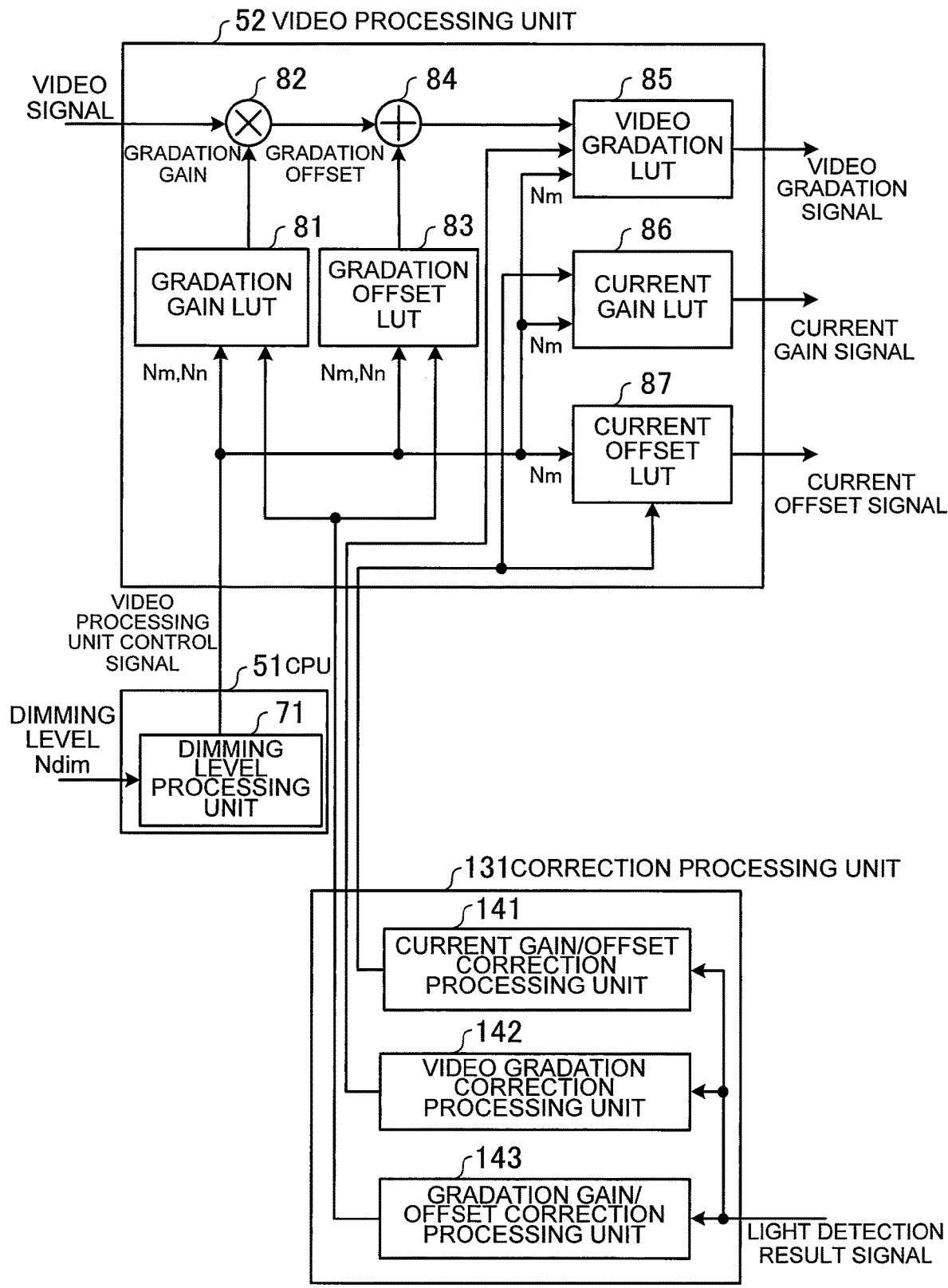
FIG. 11 is a block diagram showing a configuration example of a correction processing unit.

FIG. 11 is a block diagram showing a configuration example of the correction processing unit 131. In FIG. 11, the CPU 51 and the video processing unit 52 shown in FIG. 5 are shown, in addition to the correction processing unit 131. As shown in FIG. 11, the correction processing unit 131 includes a current gain/offset correction processing unit 141, a video gradation correction processing unit 142, and a gradation gain/offset correction processing unit 143.

The current gain/offset correction processing unit 141 generates a current gain/offset correction signal, which is a signal for correcting a current gain LUT 86 and a current offset LUT 87, based on the light detection result signal output from the photodetector 122. The current gain/offset correction processing unit 141 outputs the generated current gain/offset correction signal to the current gain LUT 86 and the current offset LUT 87.

The video gradation correction processing unit 142 generates a video gradation correction signal, which is a signal for correcting a video gradation LUT 85, based on the light detection result signal output from the photodetector 122. The video gradation correction processing unit 142 outputs the generated video gradation correction signal to the video gradation LUT 85.

The gradation gain/offset correction processing unit 143 generates a gradation gain/offset correction signal, which is a signal for correcting a gradation gain LUT 81 and a gradation offset LUT 83, based on the light detection result signal output from the photodetector 122. The gradation gain/offset correction processing unit 143 outputs the generated gradation gain/offset correction signal to the gradation gain LUT 81 and the gradation offset LUT 83.

Next, a correction method of the laser driver drive signal based on a detection result of the photodetector 122 will be described. The video display device 2 performs correction in the following three steps.

As a first step, the correction processing unit 131 corrects a current gain signal and a current offset signal in order to set, for example, the output luminance 91a to 91c and the output luminance 92a to 92c in FIG. 6 to predetermined luminance. For this reason, the video processing unit 52 outputs a first laser light source drive current and a second laser light source drive current to a laser driver 53 at a first time and a second time, respectively, with respect to each dimming mode Nm.

When light detection result signals at the first time and the second time are different from a signal value indicating a predetermined luminance, the current gain/offset correction processing unit 141 generates the current gain/offset correction signal so that the light detection result signals approach the signal value indicating the predetermined luminance.

For example, as the first laser light source drive current, the current gain signal and the current offset signal can use a current value in each mode, and a video gradation signal can use "1023". In addition, as the second laser light source drive current, the current gain signal and the current offset signal can use a current value in each mode, and the video gradation signal can use 0 or 1. As another second laser light source drive current, the current offset signal can use a current value in each mode, the current gain signal can use "0", and the video gradation signal can use a predetermined value.

In the case of using the first laser light source drive current and the second laser light source drive current, the current gain/offset correction processing unit 141 generates the current gain/offset correction signal for increasing or decreasing the current offset signal so that the light detection result signal at the second time approaches the signal value indicating the predetermined luminance. In addition, the current gain/offset correction processing unit 141 generates the current gain/offset correction signal for increasing or decreasing the current gain signal so that the light detection result signal at the first time approaches the signal value indicating the predetermined luminance.

In the above description, a signal for correcting the current offset signal is generated based on the light detection result signal at the second time and a signal for correcting the current gain signal is generated based on the light detection result signal at the first time, but the present invention is not limited thereto, and a signal for correcting each of the current offset signal and the current gain signal may be generated based on both of the light detection result signals at the first time and the second time.

As a second step, the correction processing unit 131 corrects the video gradation LUT 85 so that luminance of a maximum gradation value (255) of a video signal at a maximum in-mode level "Nn=99" of a dimming mode "Nm=k" and luminance of a maximum gradation value (255) of the video signal at a minimum in-mode level "Nn=0" of a dimming mode "Nm=k+1" are equal to each other. For this reason, the video processing unit 52 outputs a third laser light source drive current and a fourth laser light source drive current to the laser driver 53 at a third time and a fourth time, respectively.

The correction processing unit 131 performs correction so that a gradation value input to the video gradation LUT 85 becomes a predetermined value, for example, when a gradation value of the video signal is a maximum gradation value (255), at each in-mode level Nn of each dimming mode Nm.

As the third laser light source drive current, the current gain signal and the current offset signal use a current value in the dimming mode "Nm=k", and the video gradation signal is a video gradation signal when a gradation value of the video signal at the maximum in-mode level "Nn=99" of the dimming mode "Nm=k" is the maximum gradation value (255). In addition, as the fourth laser light source drive current, the current gain signal and the current offset signal use a current value in the dimming mode "Nm=k+1", and the video gradation signal is a video gradation signal when a gradation value of the video signal at the minimum in-mode level "Nn=0" of the dimming mode "Nm=k+1" is the maximum gradation value (255).

The video gradation correction processing unit 142 generates the video gradation correction signal so that light detection result signals at the third time and the fourth time are the same as each other (substantially the same as each other, which is applied to the following description).

For example, when it is determined that luminance at the third time is larger than that at the fourth time by comparison between the light detection result signals at the third time and the fourth time, the video gradation correction processing unit 142 generates the video gradation correction signal for correcting the video gradation LUT 85 so as to decrease the luminance at the third time. When it is determined that the luminance at the third time is smaller than that at the fourth time, the video gradation correction processing unit 142 generates the video gradation correction signal for correcting the video gradation LUT 85 so as to increase the luminance at the third time.

As a third step, the correction processing unit 131 corrects the gradation gain LUT 81 and the gradation offset LUT 83 so that luminance of a non-zero minimum gradation value (1) of the video signal at the maximum in-mode level "Nn=99" of the dimming mode "Nm=k" and luminance of a non-zero gradation value (1) of the video signal at the minimum in-mode level "Nn=0" of the dimming mode "Nm=k+1" are equal to each other. For this reason, the video processing unit 52 outputs a fifth laser light source drive current and a sixth laser light source drive current to the laser driver 53 at a fifth time and a sixth time, respectively.

For example, as the fifth laser light source drive current, the current gain signal and the current offset signal use a current value in the dimming mode "Nm=k", and the video gradation signal can be a video gradation signal when a gradation value of the video signal at the maximum in-mode level "Nn=99" of the dimming mode "Nm=k" is the non-zero minimum gradation value (1). As another fifth laser light source drive current, the current offset signal can use a current value in the dimming mode "Nm=k", the current gain signal can use "0", and the video gradation signal can use a predetermined value. In addition, as the sixth laser light source drive current, the current gain signal and the current offset signal use a current value in the dimming mode "Nm=k+1", and the video gradation signal can be a video gradation signal when a gradation value of the video signal at the minimum in-mode level "Nn=0" of the dimming mode "Nm=k+1" is the non-zero minimum gradation value (1).

The gradation gain/offset correction processing unit 143 generates the gradation gain/offset correction signal so that light detection result signals at the fifth time and the sixth time are the same as each other.

For example, when it is determined that luminance at the sixth time is smaller than that at the fifth time by comparison between the light detection result signals at the fifth time and the sixth time, the gradation gain/offset correction processing unit 143 generates the gradation gain/offset correction signal so as to increase the luminance at the sixth time. Specifically, the gradation gain/offset correction processing unit 143 generates the gradation gain/offset correction signal for increasing a value of the gradation offset LUT 83 corresponding to the minimum in-mode level "Nn=0" of the dimming mode "Nm=k+1". In addition, the gradation gain/offset correction processing unit 143 generates the gradation gain/offset correction signal for decreasing a value of the gradation gain LUT 81 corresponding to the minimum in-mode level "Nn=0" of the dimming mode "Nm=k+1" so that a gradation value input to the video gradation LUT 85 becomes a predetermined value, when the gradation value of the video signal is the maximum gradation value (255) at the minimum in-mode level "Nn=0" of the dimming mode "Nm=k+1".

According to the correction method described above, in the maximum in-mode level "Nn=99" of the dimming mode "Nm=k" and the minimum in-mode level "Nn=0" of the dimming mode "Nm=k+1", the luminance when the gradation value of the video signal is the maximum gradation value (255) and the luminance when the gradation value of the video signal is the non-zero minimum gradation value (1) are equal to each other. Also in dimming levels and gradation values other than the dimming level and the gradation values described above, when brightness of the video is gradually changed, in order for the brightness to be gradually changed without being suddenly changed greatly, a shape of the entire video gradation LUT 85 may be corrected based on the video gradation correction signal. For example, the video gradation LUT 85 may be linearly interpolated/extrapolated or interpolated/extrapolated with a predetermined function depending on the gradation value input to the video gradation LUT 85 so that it is not corrected when the gradation value input to the video gradation LUT 85 is the maximum gradation value (255) of the video signal at the minimum in-mode level "Nn=0" and is corrected as described in the second step when the gradation value input to the video gradation LUT 85 is the maximum gradation value (255) of the video signal at the maximum in-mode level "Nn=99". In addition, shapes of the entire gradation gain LUT 81 and gradation offset LUT 83 may be corrected based on the gradation gain/offset correction signal. For example, the gradation gain LUT 81 and the gradation offset LUT 83 may be linearly interpolated or interpolated with a predetermined function depending on the in-mode level so that it is not corrected at the maximum in-mode level "Nn=99" and it is corrected as described in the third step at the minimum in-mode level "Nn=0".

As described above, the video display device 2 includes the photodetector 122 that detects the amount of laser beam output from the laser light source unit 20 and the correction processing unit 131 that updates at least one of the magnification of the scaling and the amount of offset based on the light amount of laser beam detected by the photodetector 122. As a result, the video display device 2 can accurately correct the brightness of the video even though characteristics of the laser light source unit 20 is changed, and can enhance the continuity of the brightness of each gradation value of the video when the brightness of the video is changed.

The present invention is not limited to the abovementioned embodiments, and includes various modified examples. For example, the abovementioned embodiments have been described in detail in order to explain the present invention in an easy-to-understand manner, and are not necessarily limited to including all the components described. In addition, some of the components of any embodiment can be replaced by components of another embodiment, and components of another embodiment can be added to components of any embodiment. In addition, it is possible to add, delete, and replace other components with respect to some of the components of the respective embodiments.

In addition, each of the above components, functions, processing units, processing means and the like, may be realized by hardware by designing some or all of them with, for example, an integrated circuit. In addition, each of the above components, functions, and the like may be realized by software by interpreting and executing a program realizing each function by a processor. Information such as a program, a table, or a file that realizes each function can be stored in a recording device such as a memory, a hard disk, or a solid state drive (SSD), or a recording medium such as an integrated circuit (IC) card, a secure digital (SD) card, or a digital versatile disk (DVD).

In addition, control lines or information lines considered to be necessary for the description are shown, and all control lines or information lines are not necessarily shown for a product. In fact, it may be considered that almost all the components are connected to each other.

REFERENCE SIGNS LIST 1 video display system
2 video display device
3 screen
10 control unit
20 laser light source unit
30 scanning element
41a to 41c laser light source
42a, 42b dichroic mirror
51 CPU
52 video processing unit
53 laser driver
61 current gain circuit
62 current offset circuit
63 current addition circuit
71 dimming level processing unit
81 gradation gain LUT
82 gradation gain multiplication circuit
83 gradation offset LUT
84 gradation offset addition circuit
85 video gradation LUT
86 current gain LUT
87 current offset LUT
121 beam splitter
122 photodetector
123 control unit
131 correction processing unit
141 current gain/offset correction processing unit
142 video gradation correction processing unit
143 gradation gain/offset correction processing unit

The invention claimed is:

1. A video display device comprising:
a laser light source unit that changes an amount of emitted light depending on a drive current;
a video processing unit that outputs a video gradation signal, a current gain signal, and a current offset signal;
a laser driver that outputs the drive current based on the video gradation signal, the current gain signal, and the current offset signal; and
a dimming level processing unit that divides a dimming level for designating brightness of a video into a plurality of dimming modes and divides the dimming level into in-mode levels within the divided dimming modes,
wherein the video processing unit includes:
a video gradation value output unit that outputs the video gradation signal obtained by scaling and offsetting a gradation value of the video based on the dimming mode and the in-mode level;
a current gain output unit that outputs the current gain signal depending on the dimming mode; and
a current offset output unit that outputs the current offset signal depending on the dimming mode.

2. The video display device according to claim 1, wherein the video gradation value output unit sets an amount of offset with respect to a brightest in-mode level of a first dimming mode to be equal to or larger than an amount of offset with respect to a darkest in-mode level of a second dimming mode brighter than the first dimming mode.

3. The video display device according to claim 1, wherein the video gradation value output unit sets an amount of offset with respect to a second in-mode level of the same dimming mode as a dimming mode including a first in-mode level to be equal to or smaller than an amount of offset with respect to the first in-mode level, the second in-mode level being darker than the first in-mode level.

4. The video display device according to claim 1, wherein the video gradation value output unit sets a magnification of the scaling with respect to a second in-mode level of the same dimming mode as a dimming mode including a first in-mode level to be equal to or smaller than a magnification of the scaling with respect to the first in-mode level, the second in-mode level being darker than the first in-mode level.

5. The video display device according to claim 1, further comprising:
a photodetector that detects an amount of laser beam output from the laser light source unit; and
a correction processing unit that updates at least one of a magnification of the scaling and an amount of offset based on the amount of laser beam detected by the photodetector.

* * * * *